May 7, 1968

R. H. HABERMEHL ET AL 3,382,045

PRODUCTION OF HYDROGEN

Filed May 10, 1965

INVENTORS
ROBERT H. HABERMEHL
& KENTON A. ATWOOD

BY Norman L. Wilson Jr

THEIR ATTORNEY

United States Patent Office 3,382,045
Patented May 7, 1968

3,382,045
PRODUCTION OF HYDROGEN
Robert H. Habermehl, Louisville, Ky., and Kenton A. Atwood, New Albany, Ind., assignors to Catalysts & Chemicals Inc., Louisville, Ky., a corporation of Delaware
Filed May 10, 1965, Ser. No. 454,392
3 Claims. (Cl. 23—213)

ABSTRACT OF THE DISCLOSURE

In steam gas reforming to produce hydrogen, means for converting carbon monoxide to carbon dioxide which require no steam addition other than that added to the reformer. Steam is minimized by multi-stage conversion; it is not necessary to remove carbon dioxide between stages; and the steam requirement can be balanced with the carbon dioxide absorbent regeneration steam requirement.

---

This invention pertains to the production of hydrogen. In one of its aspects, the invention relates to hydrogen production by the well known steam-gas reforming process. In another aspect, the invention relates to an improvement in water gas shift conversion stages of the steam-gas reforming process for making hydrogen.

The chief process in use today for the production of a hydrogen gas stream, such as synthesis gases for use in the production of ammonia, methanol, oxo-alcohols, or as a substantially hydrogen stream for hydrogenation processes, is the reaction of vaporous hydrocarbons, especially methane, with steam. The overall hydrogen synthesis process includes means for eliminating, where possible, impurities or by-products from the hydrogen stream after reforming.

The following are the principal reactions occurring simultaneously in reforming.

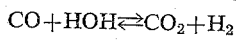

$$CH_4 + HOH \rightleftharpoons CO + 3H_2$$

$$CO + HOH \rightleftharpoons CO_2 + H_2$$

The first reaction is strongly endothermic, whereas the second reaction, the carbon monoxide shift conversion reaction, is mildly exothermic. It can be seen that the products from the reforming reaction are hydrogen, carbon monoxide, and carbon dioxide, together with steam, and unconverted methane. The purity of a hydrogen gas stream generally depends upon the quantity of methane it contains, both as unreacted methane passing through the reformer, and as methane produced by reaction of residual carbon monoxide with hydrogen in a methanator. The hydrogen gas stream will also contain greater or lesser quantities of inert gases such as nitrogen, depending on the nitrogen content of the hydrocarbon source and on the use of the end product, i.e. whether hydrogen or ammonia synthesis gas has been produced. In ammonia synthesis gas production air is burned in a secondary reforming zone to supply nitrogen for ammonia synthesis. The quantity of air thus burned is such that the nitrogen-hydrogen volume ratio is one to three in the ammonia synthesis gas produced. Small quantities of other inert gases are also generally present.

Since methane leakage, that is, unreacted methane from a reformer, is controllable in a hydrogen plant by conditions in the reformer, the purity of the hydrogen gas stream is largely dependent upon treatment of the gas stream following the reformer. Steam and carbon dioxide can be readily removed. However, carbon monoxide, methane and inerts cannot be removed economically. Methane and inerts are not objectionable, but carbon monoxide is usually objectionable, because of its poisonous nature, in processes where the hydrogen is to be used. By-product treatment is chiefly concerned, therefore, with the carbon monoxide. The hydrogen gas stream from a reformer is passed through a carbon monoxide shift conversion stage to convert the carbon monoxide, insofar as possible, to carbon dioxide which can be removed by scrubbing. Residual carbon monoxide is converted to methane by catalytic reaction with hydrogen.

This invention is concerned with by-product treatment, that is, with means of converting carbon monoxide to carbon dioxide. The invention can be best understood by reference to the accompanying drawings, wherein FIG. 1 is a process for the production of hydrogen employing a single carbon monoxide conversion stage and, following, a carbon dioxide scrubber and methanator;

Figure 1:
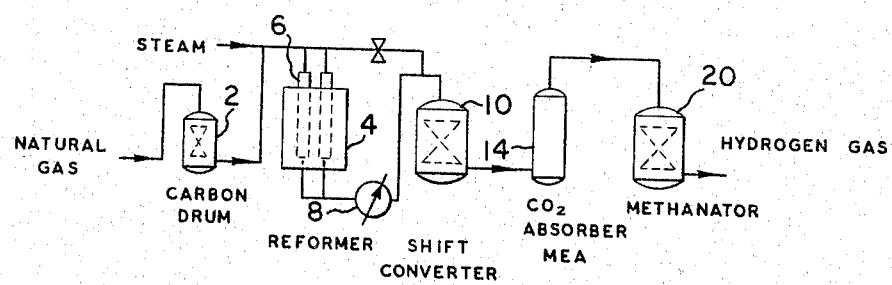
Figure 2:
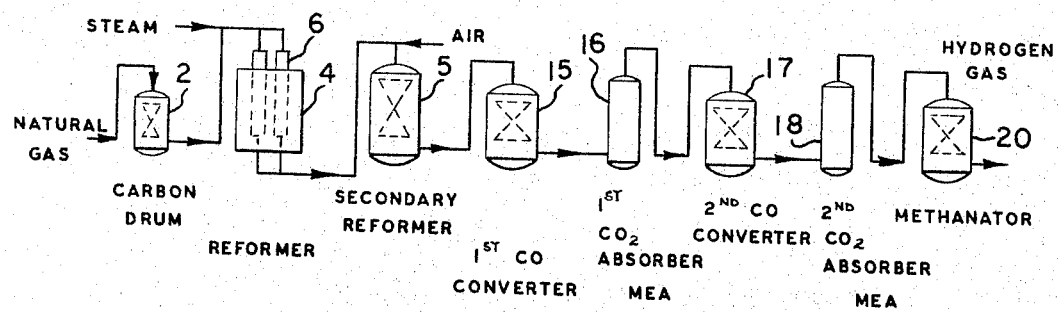
FIG. 2 is a similar process, but it employs two stages of carbon monoxide conversion, each followed by a carbon dioxide scrubber.

Referring to the processes shown in FIG. 1 and FIG. 2, a catalyst such as nickel oxide or chromium oxide supported on an aluminate or silicate refractory base is employed as a reforming catalyst in furnace 8, and a shift catalyst such as an iron-chrome shift catalyst is used in converter 10. Reference to the drawing shows that in each instance, a hydrocarbon vapor or natural gas stream is desulfurized by activated carbon, or by a metal oxide, potassium permanganate or potassium carbonate in either an absorber, or an adsorber 2 as the case may be. The desulfurized hydrocarbon gas is then reacted with steam in reforming furnace 4 containing tubes 6 filled with the catalyst. The reforming furnace is operated so that the reforming temperature, inside tube temperature, is 1200° F. to 1700° F.

By the process of FIG. 1, the reformed gas stream from furnace 4 is cooled by heat exchange means 8 to a temperature of 650° F. to 800° F. The reformed gas is then treated to convert carbon monoxide in the gas stream to carbon dioxide and hydrogen.

In FIG. 1, only one stage of shift conversion 10 is employed followed by carbon dioxide scrubber 14. By this process it is impractical to effect a conversion of carbon monoxide in a reformer effluent to less than about 1.3 percent. To reduce the carbon monoxide in the effluent to, say, 0.3 percent would take about five to six times as much catalyst and steam. The reason a large quantity of catalyst, or a high steam-gas ratio is required in the process of FIG. 1 to reduce carbon monoxide in the effluent stream to 0.3 percent is that in the shift reaction equilibrium is unfavorable for conventional shift catalysts such as the iron-chrome shift catalyst at their effective temperatures when the reaction rates are in a practical range. The greater quantity of steam or catalyst required for this conversion would render the process impractical.

Economically, there should be a balance in a shift conversion system between the steam-gas ratio, and the energy which this steam supplies to regenerate the carbon dioxide removal solution. At a conversion resulting in 0.3 percent carbon monoxide, over two and one-half times as much steam is required in a one-stage shift conversion process, such as that of FIG. 1, than is needed to supply regenerative heat to the carbon dioxide absorber. This is another reason a lower quantity of steam is used in the one-stage process of FIG. 1. As a consequence, the carbon monoxide in the stream leaving the shift converter is not below about 1.3 percent. A disadvantage of the process of FIG. 1 is the quantity of hydrogen used up when a high level of carbon monoxide is present to be converted to methane, since for each mol of carbon monoxide methanated, three mols of hydrogen are consumed. In addition the greater quantity of carbon monoxide present increases the quantity of inerts present.

Since an excessive quantity of steam is required for shifting reformer exit gases to a low residual carbon monoxide content, if a lower carbon monoxide content is desired, two stages, 15 and 17, of shift conversion are used as shown in FIG. 2. In the process of FIG. 2 a stage of carbon dioxide removal, 16 or 18, follows each shift conversion stage. The removal of most of the carbon dioxide prior to the second shift conversion results in a more favorable equilibrium condition in the second shift conversion stage at temperatures where the reaction rates are favorable for the iron-chrome catalyst used. The gas stream which passes through the second shift converter 17 and a second carbon dioxide converter 18 flows to methanator 20. In the methanator the remaining poisonous carbon monoxides and a trace of carbon dioxide are reacted with hydrogen over a catalyst such as cobalt or nickel on alumina and other carriers, to form methane. In the process of FIG. 2 wherein two stages of shift conversion are used each followed by carbon dioxide scrubbing, carbon monoxide in the gas from the second carbon dioxide scrubber is usually in the range of 0.6 to 0.3 percent. However, considerably more equipment is required, increasing initial plant and operating costs.

This invention is concerned with a process for making hydrogen wherein the carbon dioxide removal means is eliminated between the two stages of shift conversion, but wherein a hydrogen gas stream is still made which contains less than 0.6 percent (mol) residual carbon monoxide to be methanated. The process can be operated to form less than 0.3 percent residual carbon monoxide. One of the unique features of this invention is its carbon monoxide shift conversion means. The invention contemplates both high and low temperature carbon monoxide shift conversion zones. According to this invention a hydrogen gas stream produced by steam-hydrocarbon reforming is passed through two catalytic shift conversion zones, the first zone of shift conversion being operated at a high temperature, the second zone being operated at a low temperature, said zones being in series separated only by means for lowering the temperature of the stream as it passes between the zones, the high temperature zone being operated at a temperature of 650° F. or higher, the low temperature zone being operated at a temperature below 600° F.

Figure 3:
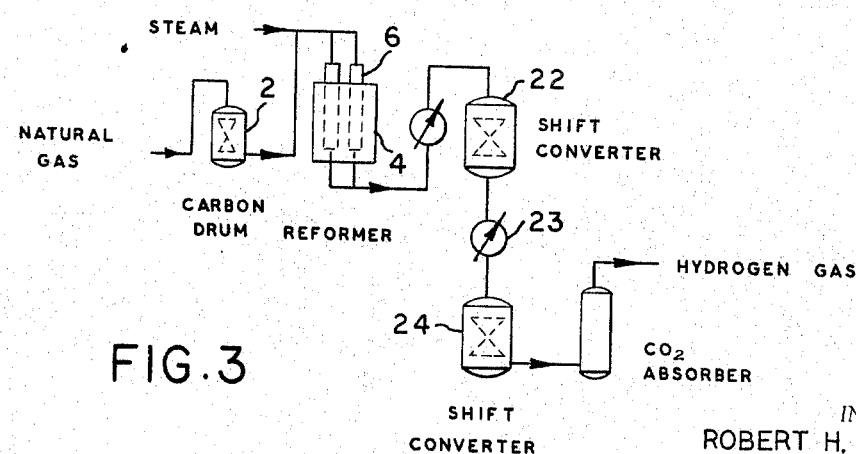
FIG. 3 is the process of this invention showing two shift converters in series, separated only by a heat exchanger.

The process of the invention involving a low temperature conversion in conjunction with a pre-conversion at conventional high temperatures overcomes defects of the processes of both FIG. 1 and FIG. 2. When both high and low shift catalysts are employed according to this invention, the weight ratio of high temperature shift catalyst to low temperature is in the range of 1:1 to 1:2. The process of the invention is illustrated by FIG. 3. The hydrocarbon gas is desulfurized in carbon drum 2 and the hydrocarbon is reacted with steam in tubes 6 of reforming furnace 4. The reformed gas stream, cooled in heat exchanger 8, then passes through two stages of catalytic conversion, a first high temperature stage 22 and a second low temperature stage 24 in series, separated only by a heat removal means 23. In high temperature stage 22 a catalyst active at a temperature of 650° F. or higher is employed. This catalyst is a conventional iron-chrome catalyst of the type described hereinbefore. This catalyst preferably is used in stage 22 at a temperature of 650° F. to 850° F., the pressure of the system being 30 to 3,000 p.s.i.g., usually atmospheric to 700 p.s.i.g.

The effluent from stage 22 is cooled in heat exchanger 23 for the second stage of shift conversion which is low temperature conversion zone 24. A catalyst active at a temperature of 600° F. or lower, preferably 350° F. to 500° F. is used in second stage converter 24. One such catalyst is a reduced copper oxide-zinc oxide catalyst described in U.S. 3,303,001. This catalyst, having zinc and copper in a ratio of 2 to 1, contains less than 0.2 percent sodium.

One of the advantages of the process of this invention is that a balance can be obtained between the steam-gas ratio employed in the carbon monoxide conversion and the steam requirement for regenerating the carbon dioxide removal solution. Many established processes are available to remove carbon dioxide after stages of carbon monoxide conversion. Almost all of the processes employ a liquid absorbent. The older absorbents which have been used are water, ethanolamines such as monoethanolamine and diethanolamine, and caustic soda. Newer absorbents for this use are hot potassium carbonate, Giammarco Vetrocoke (hot potassium carbonate containing arsenates), and Shell Sulfinol in which Sulfolane (thiocyclopentane 1-dioxide) is used.

Figure 4:
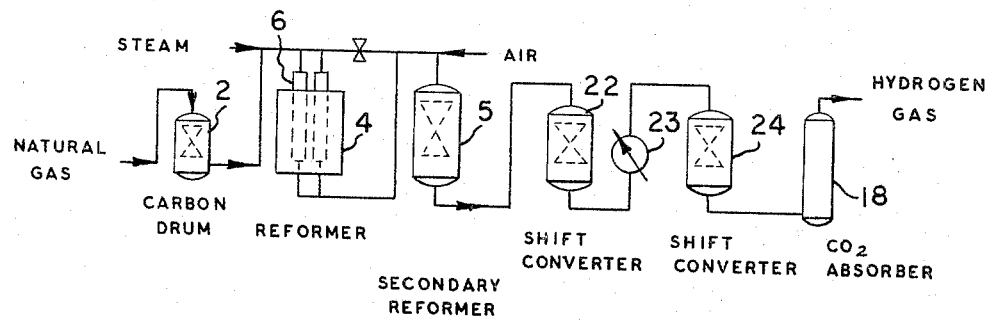
FIG. 4 is a different form of the process of the invention.

As a practical matter the steam-gas ratio employed for the carbon monoxide conversion should be balanced with the absorbent regeneration steam requirement to form a process operating with a minimum of steam. To make this more clear, consider the following. If it is assumed that the processing scheme for hydrogen production for the manufacture of ammonia synthesis gas is the conventional steam-hydrocarbon reforming—consisting of a primary and secondary reformer followed by carbon monoxide conversion, carbon dioxide removal and then methanation of the residual carbon monoxide— and that the acceptable level of residual carbon monoxide to be methanated is not more than 0.3 mol percent, the steam requirement for achieving this degree of conversion in a single stage of carbon monoxide conversion with the usual inter-stage cooling is 3.5 mols of steam per mol of dry feed gas when an iron oxide-chrome oxide catalyst is used. However, for this same conversion, if two stages of carbon monoxide conversion are used with carbon dioxide removal after each stage, as shown in FIG. 2, the over-all steam requirement is 1.4 mols of steam per mol of dry gas exit the reformer. When a combination high temperature-low temperature carbon monoxide conversion process is employed, as shown in FIG. 4, a 0.7 steam to dry gas ratio is the required steam level to reach a 0.3 percent carbon monoxide level in the feed to the methanator. Practical steam levels required in the gas to supply the energy requirement for regenerating an ethanolamine carbon dioxide removal solution is 1.40. A steam level required in the gas to supply the energy requirement for regenerating a Sulfinol carbon dioxide removal solution is 0.70. Thus, the process of FIG. 2 can be balanced with regeneration steam requirement for older carbon dioxide absorbents whereas the process of FIG. 3 and FIG. 4 can be balanced with the regeneration steam requirement for the newer carbon dioxide absorbents.

FIG. 4 shows how the process of this invention is used for ammonia synthesis gas production. This process and the process of FIG. 2 include secondary reformers 5. However, FIG. 4 shows separate high and low temperature converters 22 and 24. In addition, the methanators shown in FIG. 1 and FIG. 2 have been omitted in FIGS. 3, 4 and 5. This will, of course, be used.

The advantages afforded by the two stage shift conversion process of this invention as shown in FIGS. 3 and 4 can best be seen by reference to the following table. A comparison is given of process design features of ammonia synthesis gas manufacture using the process of FIG. 4 as Case I. Case II is a single stage process similar to that of FIG. 1, but modified for ammonia synthesis by incorporating a secondary reformer as shown in FIG. 4. The reformer pressure level in all cases is 300 p.s.i.g. exit the reformer tubes. The catalyst employed in the process of Case I is an iron-chrome catalyst in the first zone and a copper-zinc catalyst in the second zone. The iron-chrome catalyst is made by coprecipitating iron and chromium carbonates and/or hydroxides to form 9–11% $Cr_2O_3$ and 77–81% $Fe_2O_3$ employed in converter 22 of FIG. 3. The following table gives a comparison of such a process with the process of this invention wherein converter 24 contains a low temperature shift catalyst.

TABLE 2

|  | Case IV | | Case V | |
| --- | --- | --- | --- | --- |
|  | Top Bed | Bottom Bed | Top Bed | Bottom Bed |
| Catalyst Type | High Temp. | High Temp. | High Temp. | Low Temp. |
| Size | ¼" T. | ¼" T. | ¼" T. | ¼" T. |
| Quantity, cu. ft. | 160 | 160 | 160 | 160. |
| Cost, Total Inlet Flow, dry s.c.f.h | 281,650 | 312,209 | 281,650 | 313,871. |
| Inlet S./G. Ratio | 1.40 | 1.362 | 1.40 | 1.30. |
| Inlet Temperature | 700° F | 690° F | 700° F | 500° F. |
| Quench Added | 0.062 | | | |
| Exit Temperature | 770° F | 700° F | 770° F | 520° F. |
| Gas Composition, Mol Percent | In | Out | In | Out. |
| $CO_2$ | 8.95 | 17.86 | 8.95 | 18.30. |
| CO | 11.68 | 0.75 | 11.68 | 0.22. |
| $H_2$ | 57.08 | 61.28 | 57.08 | 61.48. |
| Inerts | 22.29 | 20.11 | 22.29 | 20.060. |
| Dry Inlet Gas Space Velocity | 1,760 | 1,760 | 1,760 | 1,70. |
| Operating Pressure, p.s.i.g | 262 | | 262 | | which are mixed with 3–4% graphite. The copper-zinc catalyst is described in Example 1 of U.S. 3,303,001. The iron-chrome catalyst used in Case I is also used in the single-stage converter process of Case II, operated with higher inerts in the synthesis gas loop. Case III is a process similar to that shown in FIG. 2 with amine carbon dioxide removal after each stage of carbon monoxide conversion to obtain greater conversion of the carbon monoxide.

TABLE 1

|  | Case I | Case II | Case III |
| --- | --- | --- | --- |
| CO in Shift Converter Effluent,[1] mol percent, dry basis | 0.2 | 1.1 | .5 |
| Inerts and $CH_4$ Exit Methanator, mols/hr | [2] 29.89 | [3] 70.85 | [4] 38.30 |
| Synthesis Gas Required for 300 T./D. $NH_3$: |  |  |  |
| Mols/hr | 3,114.98 | 3,361.01 | 3,165.46 |
| Relative Amount, percent | 100 | 107.9 | 101.6 |
| Hydrocarbon, mols/hr.: |  |  |  |
| Process Requirements | 702.44 | 788.11 | 720.68 |
| Fuel Requirements | 205.63 | 331.68 | 451.77 |
| Total Requirements | 998.07 | 1,119.79 | 1,172.45 |
| Relative Amount, percent | 100 | 112.2 | 117.47 |
| Air, mols/hr.: |  |  |  |
| Process Requirements | 988.47 | 1,054.25 | 1,001.99 |
| Fuel Requirements | 2,957.70 | 3,318.42 | 4,510.74 |
| Total Requirements | 3,946.17 | 4,372.67 | 5,521.73 |
| Relative Amount, percent | 100 | 110.81 | 139.93 |
| Steam Requirements: |  |  |  |
| Total Lbs./Hr | 69,570 | 75,200 | 114,350 |
| Relative Amount, percent | 100 | 108.1 | 164.4 |
| Relative Reformer Size | 100 | 112.9 | 103.0 |
| Relative Shift Converter Size | 100 | 125.1 | 194.6 |

[1] Practical level of carbon monoxide in shift converter effluent using the steam requirements of the carbon dioxide regeneration system to full effectiveness in the shift converter.
[2] 0.96 mol percent.
[3] 2.1 mol percent.
[4] 1.21 mol percent.

Comparison of the hydrocarbon requirements in the systems in Table 1 shows that the use of a high temperature-low temperature process according to this invention permits the synthesis gas section of a plant to be reduced in size by approximately 12 percent. The advantages of the invention are best exemplified by reference to the relative values. The relative amount of gas, or the relative size of a reformer or converter are taken as 100 for the process of this invention. It will be noted that prior art Cases II and III show the relative amounts or sizes to be considerably larger. Thus, considering the size of the shift converter employed in the process of the invention to be 100, the shift converter size for the process of Case II is 125.1. The size in the process of Case III is 194.6. Other relative figures are given in Table 1. It can be seen that the invention results in an improvement throughout the process.

To further illustrate the invention shift converter 24 in FIG. 3 was filled with the same iron-chrome catalyst Various advantages of this invention are apparent from Table 2. The hydrocarbon runs the same cycle length at a 5 percent greater throughput. A reformer performs with a 5 percent greater throughput and with 5 percent less fuel, or it operates at a 10 percent higher throughput with the same fuel. The secondary reformer easily handles the extra throughput. The use of the low temperature shift catalyst according to this invention permits operation with a greater air to hydrocarbon ratio. The methanator handles 8 to 10 percent more throughput and the effective capacity of the compressors is increased about 5 percent. With compressor leeway, the plant can readily produce 10 percent more ammonia.

Figure 5:
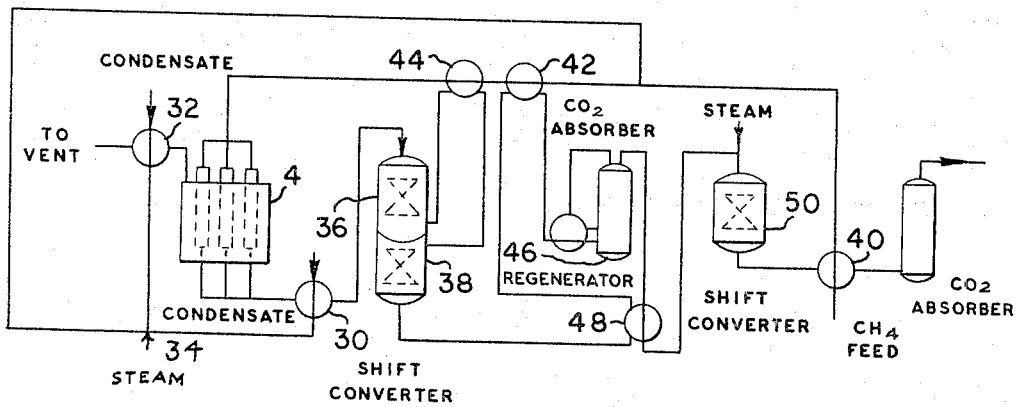
FIG. 5 shows still another embodiment of the invention.

Referring now to FIG. 5, another variation of the process of the invention is shown. In this process a high temperature shift conversion zone 36 is followed by two stages 38 and 50 of low temperature shift conversion. The other units in the process such as reformer 4 have been previously described. By the process a hydrogen purity of 99.8 percent is produced at 1500° F., a pressure of 185 p.s.i.g. and a steam-gas ratio of 8 to 1, with an additional 1.2 parts of steam to 1 part by volume of reformer feed being added to the shift converter to give a 0.3 to 1 steam to gas ratio to this converter 50. Steam made in waste heat boiler 30 and results in a ratio of 3.5 to 1. Flue gas steam made at 32 makes the ratio 6.5 to 1 and the remainder, at least 1.5 is added at 34. With high temperature shift converter 36 operated at 700 F., low temperature converter 38 operates at 500 F., and low temperature converter 50 operates at 400 F. The feed gas stream is heated at 40, 42 and 44 and the effluent from carbon dioxide scrubber 46 is heated at 48 prior to admission to a second low temperature shift converter, the third stage 50. After this third conversion in stage 50 carbon dioxide is again removed, the scrubber yielding the following gas stream:

| | |
| --- | --- |
| CO | 0.07 |
| $CO_2$ | 0.03 |
| $H_2$ | 99.80 |
| $CH_4$ | 0.10 |

Because of the use of the low temperature shift system employed, only 1.2 parts of steam per part hydrocarbon feed to the reformer are required at 50 for the hydrogen purity obtained, in addition to the 8 to 1 steam-gas ratio provided at 30, 32 and 34. However, if 38 and 50 were high temperature shift converters about 5 parts steam instead of 0.3 would be needed, an additional 4.7 parts. FIG. 5 thus shows that more than one stage of low temperature shift conversion can be employed. Other modifications will occur to one skilled in the art. Such ramifications are deemed to be within the scope of this invention.

What is claimed is:

1. In the process for the production of a hydrogen gas stream wherein a vaporous hydrocarbon is (a) desulfurized, (b) subjected to steam gas reforming at a temperature of 1200° F. to 1700° F. and with sufficient steam so that the steam gas ratio of the reformer effluent is 0.7 to 3.5, (c) subjected to at least one stage of a water gas shift reaction to convert carbon monoxide to carbon dioxide, (d) passed through a regeneratable carbon dioxide absorbent solution, and (e) reacted with hydrogen in a methanation stage to convert unreacted carbon oxides to methane, the improvement whereby a hydrogen stream containing less than 0.6 percent residual carbon monoxide to be methanated is produced in several stages of shift conversion with no carbon dioxide removal between shift conversion stages, with no steam addition to said process other than to the reforming stage, yet with a reformer effluent steam gas ratio not exceeding 1.4, said improvement comprising carrying out the carbon monoxide conversion in a first water gas shift reaction conducted at a temperature of 650° F. to 850° F. and catalyzed by an iron-chrome catalyst, cooling the first shift reaction effluent to 350° F. to less than 600° F. by indirect heat exchange, with no addition of water, and without removing carbon dioxide from said effluent, carrying out a second water gas shift reaction conducted at the temperature of 350° F. to less than 600° F. and catalyzed by a copper-zinc catalyst containing zinc and copper in a ratio of 2 zinc to 1 copper and less than 0.2 percent sodium by weight.

2. In the process for the production of a hydrogen gas stream wherein methane is (a) desulfurized, (b) subjected to steam gas reforming at a temperature of 1200° F. to 1700° F. and with sufficient steam so that the steam gas ratio of the reformer effluent is 0.7 to 3.5, (c) subjected to at least one stage of a water gas shift reaction to convert carbon monoxide to carbon dioxide, (d) passed through a regeneratable carbon dioxide absorbent solution and (e) reacted with hydrogen in a methanation stage to convert unreacted carbon oxides to methane, the improvement wherein the carbon monoxide conversion is balanced with the carbon dioxide absorbent regeneration steam requirement to form a process operating with a minimum of steam, said improvement comprising conducting the reforming with sufficient steam so that the steam gas ratio of the reforming reaction effluent is 0.7, subjecting said reforming reaction effluent to shift conversion using a temperature of 650° F. to 800° F. and an iron-chrome catalyst, cooling the shift converted stream to a temperature of 350° F. to 500° F. by indirect heat exchange, at said temperature effecting a second water gas shift reaction, catalyzed by a copper-zinc catalyst containing zinc and copper in a ratio of 2 zinc to 1 copper and less than 0.2 percent sodium by weight, and subsequently passing the shift gases through a carbon dioxide absorbing solution selected from the group consisting of potassium carbonate, potassium carbonate containing an arsenate and thiocyclopentane 1-dioxide, the steam gas ratio of 0.7 being the ratio resulting in a 0.3 percent carbon oxide level in the stream to be methanated, said ratio also being the ratio required to supply that quantity of steam necessary to regenerate the carbon dioxide absorbing solution.

3. In the process for the production of a hydrogen gas stream wherein a vaporous hydrocarbon is (a) desulfurized, (b) subjected to steam gas reforming at a temperature of 1200° F. to 1700° F. and with sufficient steam so that the steam gas ratio of the reformer effluent is 0.7 to 3.5, (c) subjected to at least one stage of a water gas shift reaction to convert carbon monoxide to carbon dioxide, (d) passed through a regeneratable carbon dioxide absorbent solution, and (e) reacted with hydrogen in a methanation stage to convert unreacted carbon oxides to methane, the steps of carrying out the carbon monoxide conversion in a first water gas shift reaction conducted at a temperature of 650° F. to 850° F. and a second water gas shift reaction conducted at a temperature of 350° F. to less than 600° F., with no carbon dioxide removal between the shift conversion stages, the cooling between stages being effected without adding steam, the first shift reaction being catalyzed by an iron-chrome catalyst, the second water gas shift reaction being catalyzed by a copper-zinc catalyst containing zinc and copper in a ratio of 0.5 to 3 zinc to 1 copper and less than 0.2 percent sodium by weight.

References Cited

UNITED STATES PATENTS

| | | | |
|---|---|---|---|
| 1,756,934 | 5/1930 | Beekley | 23—213 |
| 1,797,426 | 3/1931 | Larson | 23—213 |
| 2,487,981 | 11/1949 | Reed | 23—213 |
| 2,631,086 | 3/1953 | Moak et al. | 23—213 |
| 2,960,388 | 11/1960 | Johnson et al. | 23—213 |
| 3,010,807 | 11/1961 | Christenson et al. | 23—213 |
| 3,074,783 | 1/1963 | Paull et al. | 23—212 |
| 3,150,931 | 9/1964 | Frank | 23—213 |
| 3,251,652 | 5/1966 | Pfefferle | 23—213 |
| 3,297,408 | 1/1967 | Marshall | 23—212 |
| 3,303,001 | 2/1967 | Dienes | 23—213 |

FOREIGN PATENTS 594,285   3/1960   Canada.

OSCAR R. VERTIZ, *Primary Examiner.*

EDWARD STERN, *Examiner.*